T. Hansbrow,
Amalgamator,
No. 40,406. Patented Oct. 27, 1863.
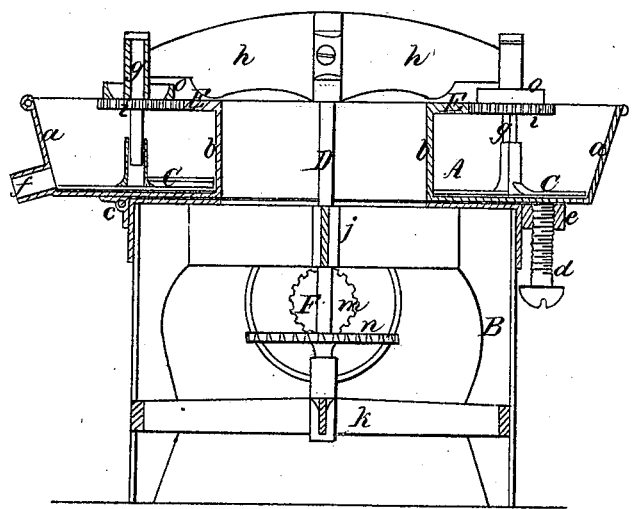
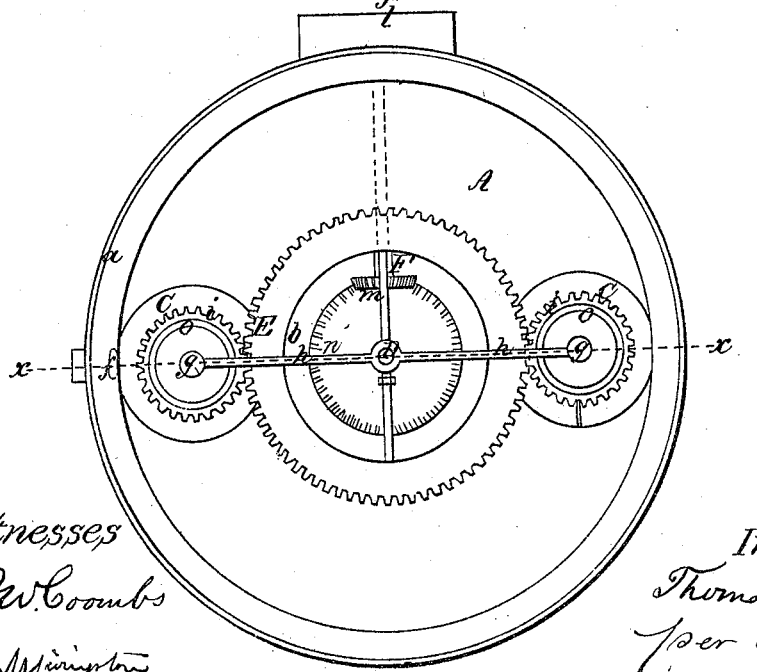
Witnesses
J. W. Coombs
M. M. Livingston
Inventor
Thomas Hansbrow
per Munn & Co
attorneys

UNITED STATES PATENT OFFICE.

THOMAS HANSBROW, OF SACRAMENTO, CALIFORNIA.

IMPROVED AMALGAMATOR.

Specification forming part of Letters Patent No. 40,406, dated October 27, 1863.

*To all whom it may concern:*

Be it known that I, THOMAS HANSBROW, of Sacramento, in the county of Sacramento and State of California, have invented a new and Improved Amalgamator; and I do hereby declare that the following is a full, clear, and exact description of the same, reference being had to the accompanying drawings, forming a part of this specification, in which—

Figure 1 represents a vertical central section of my invention, taken in the plane indicated by the line $x$ $x$, Fig. 2. Fig. 2 is a plan or top view of the same.

Similar letters of reference in both views indicate corresponding parts.

This invention relates to an improvement in that class of amalgamators in which the finely-pulverized ore is intimately mixed with the mercury by the action of a rotating muller or mullers in a suitable pan.

The invention consists in imparting to the muller or mullers, which are attached to arms extending from a common central arbor, a compound rotary or a sun-and-planet motion by the action of a central stationary toothed rim or pinions secured to the axles of the mullers in such a manner that by the rapid rotary motion of each muller round its individual axis that portion of the ore which may be exposed to the action of said muller at a certain moment is brought in intimate contact with the mercury, and by the common rotary motion of the several mullers round the central arbor the entire contents of the pan are successively and repeatedly exposed to the action of each muller.

The invention consists, also, in the arrangement of a set-screw on one end of a hinge on the opposite side of the pan in such a manner that the position of the pan and inclination can be adjusted at pleasure.

To enable those skilled in the art to make and use my invention, I will proceed to describe it.

A represents a pan, made of sheet-iron or any other suitable material, with two flanges or rims, $a$ $b$, one on the outside and one in the center, as clearly shown in the drawings. This pan is secured to a frame, B, of metal or any other suitable material, by means of a hinge, $c$, which allows of tilting the pan and of adjusting the same to any desired inclination.

In order to adjust the pan readily to the desired position, a set-screw, $d$, is provided, which screws into a lug, $e$, projecting from that side of the frame B opposite the hinge $c$, and which bears on the bottom of the pan. By this arrangement the pan can be readily adjusted in the proper position in relation to the central rim, which produces the motion of the mullers, and if it is desired to empty the pan it can be readily tilted so as to discharge its contents through an opening, $f$, in the outside rim, $a$, close down to the bottom and over the hinge $c$.

C C are the mullers, which consist of disks of cast-iron or granite or other suitable material, and are attached to vertical spindles $g$, so that they can readily rise and fall, being compelled, however, to rotate with said spindles. The spindles $g$ have their bearings in the outer ends of arms $h$, which extend from the central vertical arbor, D, and each of said spindles carries a pinion, $i$, which gears in a toothed rim, E, projecting from the top edge of the central rim, $b$, of the pan. The central arbor, D, has its bearing in a cross-bar, $j$, close under the pan, and it is stepped in a second cross bar or bridge-tree, $k$, in the lower part of the frame. It receives its motion from a horizontal shaft, F, which has its bearing in a suitable box or boxes attached to the frame B, and to which motion is imparted by a pulley, $l$, from a steam-engine or any other source of power. The motion is transmitted from the shaft F to the arbor D by a bevel-gear, $m$ $n$, the wheel $m$ being secured to the shaft F, and the wheel $n$ to the arbor D.

The pinions $i$ on the spindles $g$ of the mullers are provided with annular flanges $o$ to catch the waste oil which may drip down from the bearings of said spindles, and to prevent such waste oil from passing down and mixing with the contents of the pan A. By imparting motion to the vertical arbor D the pinions $i$, gearing into the toothed rim E, the diameter of which is much larger than that of the pinions, receive a rapid rotary motion, causing each of the mullers to revolve a number of times for each revolution of the arbor D. By this rapid motion the pulverized ore is brought in intimate contact with the quicksilver at any point in which the muller may be situated at a certain moment, and, by the rotary motion of the central arbor itself, the mullers are caused to sweep through the whole pan, and the amalgamation of the ore is effected more perfectly and in a shorter time than with amalgamators of the ordinary construction.

What I claim as new, and desire to secure by Letters Patent, is—

1. Imparting to the muller or mullers C a sun-and-planet motion, in the manner and for the purpose substantially as described.

2. The central stationary toothed rim, E, in combination with the rotary arbor D, pinions $i$, mullers C, and pan A, all constructed and operating substantially as and for the purpose set forth.

3. The set screw $d$, in combination with the hinged pan A, constructed and operating as specified.

THOS. HANSBROW.

Witnesses:
 THOS. L. J. DOUGLAS,
 GEO. W. REED.